United States Patent
McCormack (10) Patent No.: US 10,876,515 B2
(45) Date of Patent: Dec. 29, 2020

(54) POWER GENERATING WATER TURBINE ASSEMBLY

(71) Applicant: Vincent McCormack, Newcastle West (IE)

(72) Inventor: Vincent McCormack, Newcastle West (IE)

( * ) Notice: Subject to any disclaimer, the term of this patent is extended or adjusted under 35 U.S.C. 154(b) by 315 days.

(21) Appl. No.: 14/780,645

(22) PCT Filed: Mar. 28, 2014

(86) PCT No.: PCT/EP2014/056306
§ 371 (c)(1),
(2) Date: Sep. 28, 2015

(87) PCT Pub. No.: WO2014/154872
PCT Pub. Date: Oct. 2, 2014

(65) Prior Publication Data
US 2016/0032888 A1    Feb. 4, 2016

(30) Foreign Application Priority Data

Mar. 28, 2013  (GB) .................................. 1305762.5

(51) Int. Cl.
*F03B 13/26* (2006.01)
*F03B 17/06* (2006.01)
*F03B 3/18* (2006.01)

(52) U.S. Cl.
CPC .............. *F03B 13/264* (2013.01); *F03B 3/18* (2013.01); *F03B 17/062* (2013.01);
(Continued)

(58) Field of Classification Search
CPC .......... F03B 3/18; F03B 3/183; F03B 13/264; F03B 17/062; F03D 3/002; F03D 3/005;
(Continued)

(56) References Cited

U.S. PATENT DOCUMENTS 4,156,580 A  *  5/1979  Pohl .......................... F03D 3/02
                                                                290/55
4,363,564 A     12/1982  Borgren
(Continued)

FOREIGN PATENT DOCUMENTS

CN         102305191        1/2012
DE         29 05 569        8/1980
(Continued)

OTHER PUBLICATIONS

Machine translation of WO 2011098686 A1 (Aug. 18, 2011) from Espacenet.*
Machine translation of EP 0064440 A2 (Year: 1982).*

*Primary Examiner* — Moshe Wilensky
*Assistant Examiner* — Christopher R Legendre
(74) *Attorney, Agent, or Firm* — Levy & Grandinetti (57) ABSTRACT

An accelerator and water turbine assembly is provided for mounting in a tidal stream having a water turbine (12) and a water flow accelerator for providing a turbine driver current having a speed greater than that of the uninterrupted ambient tidal stream in which the accelerator has an accelerator body member (11) having a water flow facing front face (13) and side faces (14) depending therefrom around which the water flows adjacent each of the side faces as a turbine driver current and in which the water turbine (12) is mounted to be at least partially shrouded by the accelerator body member from the accelerated turbine driver current flowing adjacent and relatively close to a side face of the accelerator where the water flow achieves substantially maximum velocity and in which the accelerator is laterally spaced apart from the turbine driver current modifying effect of any other flow obstruction.

11 Claims, 7 Drawing Sheets (52) U.S. Cl.
 CPC ....... *F05B 2240/12* (2013.01); *F05B 2240/13* (2013.01); *Y02E 10/20* (2013.01)

(58) Field of Classification Search
 CPC . F03D 3/02; F03D 3/04; F03D 3/0409; F03D 3/0427; F03D 3/0436; F03D 3/0445; F03D 3/0454; F03D 3/0463; F03D 3/0472; F03D 3/049; F05B 2240/12; Y02E 10/20; Y02E 10/22; Y02E 10/223; Y02E 10/28; Y02E 10/30
 See application file for complete search history.

(56) References Cited

U.S. PATENT DOCUMENTS

| | | | |
|---|---|---|---|
| 4,519,742 A | 5/1985 | Van Buytene | |
| 4,764,683 A * | 8/1988 | Coombes | F03D 3/0454 290/44 |
| 8,432,056 B2 * | 4/2013 | Bailey | F03B 1/02 290/43 |
| 8,946,923 B2 * | 2/2015 | Steel | F03D 3/005 290/54 |
| 9,062,427 B2 | 6/2015 | Kittel | |
| 2005/0236843 A1 * | 10/2005 | Roddier | F03B 13/264 290/54 |
| 2008/0231057 A1 | 9/2008 | Zeuner | |
| 2009/0146432 A1 * | 6/2009 | Ballena | F03D 3/0445 290/55 |
| 2009/0226296 A1 * | 9/2009 | Bibeau | F03B 13/264 415/1 |
| 2010/0066089 A1 * | 3/2010 | Best | F03B 3/06 290/52 |
| 2010/0135768 A1 | 6/2010 | Pitre | |
| 2013/0139499 A1 * | 6/2013 | Kerckove | F03B 13/264 60/504 |
| 2014/0054895 A1 | 2/2014 | Steel | |
| 2016/0032888 A1 * | 2/2016 | McCormack | F03B 13/264 415/60 |

FOREIGN PATENT DOCUMENTS

| | | | | |
|---|---|---|---|---|
| DE | 202004018879 U1 * | 2/2005 | | F03D 3/02 |
| DE | 102007060721 A1 * | 6/2009 | | F03D 1/04 |
| DE | 102011109217 | 6/2012 | | |
| DE | 102014001891 A1 * | 8/2015 | | F03D 3/02 |
| FR | 0064440 A2 * | 11/1982 | | F03D 3/02 |
| GB | 2493003 | 1/2013 | | |
| JP | H09242658 | 9/1997 | | |
| WO | WO 2008/115558 | 9/2008 | | |
| WO | 2011-098686 A1 | 8/2011 | | |
| WO | WO 2011/098686 | 8/2011 | | |
| WO | WO 2012/006688 | 1/2012 | | |

* cited by examiner

POWER GENERATING WATER TURBINE ASSEMBLY

CROSS-REFERENCE TO RELATED APPLICATIONS

This application is the United States National Phase of Patent Application No. PCT/EP2014/056306 filed 28 Mar. 2014, which claims priority to British Patent Application No. 1305762.5 filed 28 Mar. 2013, each of which is incorporated herein by reference.

INTRODUCTION

The present invention relates to an accelerator and water turbine assembly for mounting in a tidal stream comprising a water turbine and a water flow accelerator for providing a turbine driver current having a speed greater than that of the uninterrupted ambient tidal stream. These assemblies are used almost exclusively for electrical power generation though they are also useful for water pumps, air compressors and similar equipment. The term "tidal stream" is used in this specification because in many instances such water turbines are placed in locations subject to tidal variations. However, the terms in this specification "tidal stream" and, "current" are to be understood to refer not simply to the flow of water subject to tidal variations but to any moving body of water such as a river, ocean currents and water discharges from structures generally. Further the terms "tidal stream" and "current" are used in this specification interchangeably. Hydroelectric power is one of the most significant if not the most significant reusable energy source available. Tidal streams are the most significant source of such power which is not being utilised sufficiently for some very good reasons.

While it is axiomatic that the capital equipment costs, which are particularly expensive in respect of marine installations, together with ongoing maintenance costs are a major factor, it is however important to consider the technical factors affecting the use of water turbines for a hydroelectric generation and similar power output tasks. Since these technical factors have a major bearing on the financial investment and subsequent financial outcome considerable work has been done on these in the past with as of yet not that encouraging outcomes.

The three principal technical reasons, usually cited, for not using such hydroelectric power are firstly, the problems in obtaining a sufficiently strong tidal stream, or more correctly as it is described in this specification, sufficiently fast turbine driver current, secondly, the need to protect the water turbine from debris and thirdly and finally, protecting the assembly from damage under adverse weather conditions.

However, the principal problem is that the amount of energy generated by a water turbine and hence its power output, as one would expect, is directly related to the tidal current experienced by the turbine namely this turbine driver current. Clearly, it is essential to place a water turbine where it experiences the optimum turbine driver current. What makes it even more significant is that the potential power output is not linearly proportional to the turbine driver current but to the third power of the turbine driver current. Accordingly, a twofold increase in turbine driver current results in a potential eight fold increase in water turbine output. It is indeed known that, in certain places in the world, the speed of the tidal stream is quite significant, but still relatively slow as regards the driving of turbines. Unfortunately, this relatively high-speed tidal stream is not the case in most situations where the uninterrupted ambient flow is insufficient to act as a suitable turbine driver current. According, the major problem that has received the most attention is the need to improve the turbine driver current and this problem transcends all others. Accordingly, anything which accelerates the uninterrupted ambient tidal stream to provide the turbine driver current is more important than anything else. This applies equally in situations where the uninterrupted ambient tidal stream is sufficient to provide an adequate turbine driver current but more importantly where it does not.

When one considers that the absolute theoretical maximum efficiency for a turbine rotor is 59.3%, a well-known limit attributed to the German aerodynamicist Albert Betz, it is easy to appreciate that when the efficiency of commercial water turbines have reached of the order of 50% the scope for added efficiency in the design of the water turbines to increase their output efficiency is relatively limited. Clearly by very simple arithmetic, if one suggests that there is an uninterrupted ambient tidal stream of a particular speed acting as a driver current for a water turbine operating at 60% efficiency i.e. the theoretical maximum and it is compared it to a water turbine acting at 40% efficiency, but in a driver current 25% more than the first driver current, there is actually a 30% increase in power output for the latter. If the turbine is made to act at 50% efficiency with the same conditions the advantage is over 60%. Accordingly increasing the driver current is the most important issue. To repeat what has been stated above if it is possible to double the driver current with respect to the uninterrupted ambient current the efficiency gain is simply enormous.

The various proposals made in the past to tackle these problems can be divided into essentially two areas. The first one comprises providing effectively a pair of spaced apart obstructions on the seabed which concentrate the flow of the tide towards a water turbine mounted therebetween. There are also floating versions of these obstructions with pontoons connected together to form a venturi funnel, again for concentration of the flow. These have not proved to be particularly successful. It would appear that the flow tends to be choked rather than deliver the necessary increase in speed as one would expect. A classic example of such a construction is described in US Patent Application Publication No. US 2005/0236843 A1 (Roddier et al).

US Patent Application Publication No. US 2009/0226296 B1 (Bibeau et al) describes using a shaped object located on the ocean floor which increases the flow velocity and consequently the turbine driver current and is located upstream of a tethered water turbine. The location of the shaped object is effectively installed independently of the water turbine and is also used to protect the turbine by being able to move the turbine behind the shaped object into the relatively stagnant wake region behind the object. Again it would appear that the increase in velocity to provide the turbine driver current is much less than what one would expect. In some ways the most important criticism of the effectiveness and efficiency of the arrangements disclosed in this reference is in fact contained in the paragraph 0068 of this reference It purports to have an increase in power of somewhat of the order of between 6% and 17%, hardly sufficient to justify the added expenditure in the construction. Also, and it has some relevance in relation to the present invention, there is a considerable discussion in this reference on the necessity to increase the amount of turbulent flow downstream of the obstruction, which in the present invention is generally undesirable or at best irrelevant.

The present invention is directed towards providing an accelerator and water turbine assembly for providing a turbine driver current having a speed substantially greater than that of the uninterrupted ambient tidal stream.

According to one aspect of the present invention, there is provided an accelerator and water turbine assembly for mounting in a tidal stream comprising a water turbine and a water flow accelerator for providing a turbine driver current having a speed greater than that of the uninterrupted ambient tidal stream in which the accelerator comprises an accelerator body member having a water flow facing front face and side faces depending therefrom around which the water flows adjacent each of the side faces as a turbine driver and in which the water turbine is mounted so as to be at least partially shrouded by the accelerator body member from the accelerated turbine driver current flowing adjacent and relatively close to a side face of the accelerator where the water flow achieves substantially its maximum velocity and in which the accelerator is laterally spaced apart from the turbine driver current modifying effect of any other flow obstruction.

The inventors have also found that the present invention is particularly suitable for use in locations where the tidal flow rate is generally low, at say up to 1.5 m/s because of the effect of the accelerator. This is particularly advantageous because it enables the systems to be deployed in many more locations than known systems, resulting in a potential for much greater and more efficient use of tidal flows.

Further the inventors have found that the accelerator and turbine arrangement of the present invention is ideally suited for use in expansive (relatively wide and deep) open flows where fluids could find an easier path of less resistance. it has been found that if two accelerators or obstructions are too close together their combination acts as a single obstruction and the space between them restricts the flow and causes turbulent flow between them, which is undesirable.

Further, the size of the turbine can be chosen to only experience turbine driver current of a speed greater than a predetermined percentage of the uninterrupted ambient tidal stream. Heretofore, it does not appear to be that any construction of accelerator has been provided which has been placed such that the turbine to which it directs turbine driver current has been close to it where essentially maximum acceleration of the uninterrupted ambient stream is provided. One of the major and unexpected advantages of ensuring that for example the minimum turbine driver current is of the order of 80% greater than the uninterrupted ambient tidal stream is that semi-submerged/suspended debris and flotsam generally are forced away from the turbine by this accelerated turbine driver current. This is actually caused by fluid pressure changes around the device. The fluid velocity slows as it meets the front of the accelerator face resulting in an increase in fluid pressure which in turn pushes suspended debris away from the turbine.

According to another aspect of the present invention there is provided an accelerator and water turbine assembly, in which the water turbine is mounted adjacent the widest part of the accelerator body member facing the ambient stream.

In one embodiment of the invention the water turbine is mounted so as to be at least partially shrouded by the accelerator body member from the accelerated tidal stream passing down its side face. This shrouding may be provided by mounting the water turbine into a recess in the side face of the accelerator body member or by attaching a deflection flap to the face of the accelerator. This greatly improves the operation of the water turbine. It has been found that at least 5% and not more than 50% of the outside diameter of the water turbine is shrouded and generally this is between 5% and 35%. It is envisaged that the amount of shrouding will be dependent on the particular construction of vertical axis turbine chosen.

There are clear advantages in mounting the turbine within the accelerator particularly where the accelerator is in the form of a pontoon as is often ideal. Firstly the turbine is protected from damage and secondly by its shrouding its efficiency has increased.

According to another aspect of the present invention, the water turbine is mounted at the widest part of the accelerator body member or slightly downstream of it, facing the ambient stream where the greatest turbine driver current is produced.

The front face and portion of each side face of the accelerator body member are all of substantially arcuate shape. Conveniently and advantageously, the arcuate shape may be semi-circular. This shape facilitates the provision of laminar flow and a lack of turbulence.

In one embodiment of the invention the accelerator body member is substantially ellipsoidal in plan and in another substantially mirrors an aerofoil section in plan.

In one embodiment of the invention where the dimensions of the water turbine are so chosen that it projects a distance between 0.2 and 0.6 of the widest width of the accelerator body member into the accelerator tidal stream. Ideally it projects 0.4 of the widest part of the accelerator body.

Ideally, the accelerator water turbine assembly is laterally spaced apart from the ambient flow modifying effect of any other flow obstruction by a distance such that the presence of the flow obstruction does not interfere with the tidal stream to substantially modify the turbine driver current. This spacing may be of the order of the aggregate of the total width of the accelerator body member at its widest part facing the ambient tidal stream and the distance at which the water turbine projects beyond the accelerator body member, whereby there is a tidal stream of substantially the same speed as the uninterrupted ambient tidal stream laterally spaced from the accelerator body and the water turbine.

In another embodiment of the invention there is an accelerator and water turbine assembly in which the spacing between adjacent accelerator and water turbine assemblies is of the order of the aggregate of the total width of the accelerator body member at its widest part facing the tidal stream and the distance the water turbine projects beyond the accelerator body member, where there is a tidal stream of substantially the same speed as the uninterrupted ambient tidal stream laterally spaced from the accelerator body and the water turbine.

In one arrangements of the accelerator and water turbine assemblies according to the invention a plurality of accelerator and water turbine assemblies are mounted in rows and columns in the tidal stream, the rows being substantially at 90° to and the columns at 45° to the flow of the tidal stream.

A pontoon is envisaged as being very suitable for mounting an accelerator and water turbine assembly of the invention.

Other alternative locations for mounting the accelerator include tethered moorings, which may be partially submerged, or preferably fully submerged. Preferably the accelerator body may be mounted and secured to the bottom of the waterway.

A further alternative location is to secure one or more turbines to the sides of bridge supports in rivers or seaways.

The invention will be more clearly understood by the following description of some embodiments thereof, given by way of example only with reference to the accompanying drawings, in which:

Before discussing and describing how the invention is constructed and operated it is important to make certain general comments and specifically in relation to various investigations carried out by the applicant. It is probably important to pose the question why when everybody skilled in this particular technology understood that when a tidal stream or current impinges on an object in its path and has to circumvent the object that the tidal stream or current is speeded up. However, nobody appears to have examined this acceleration and applied it to the problem of maximising the turbine driver current.

Having considered the various problems in relation to this technology it became apparent that the most important issue was to, in some way, examine how the maximum acceleration of the uninterrupted ambient tidal stream could be achieved and how this knowledge could be best applied to hydroelectric power generation. This was decided on after various field trials with the associated field test results having been carried out. For ease of understanding the laboratory tests are described first and then the field tests though indeed many of the field tests were carried out prior to the laboratory tests.

It was decided to carry out laboratory tests on various prototypes of different sizes and shapes so as to examine and analyse the flow diversion around an obstacle in an open channel flow. In order to achieve flow acceleration by means of flow diversion around an obstacle, the upstream face of the obstacle must be curved to avoid the generation of turbulence. A review of literature found that very little work has been conducted on quantification of accelerated flows around obstacles, the vast majority of the work in which accelerated flows have been observed is based on flow around cylinders or ellipses for the purpose of determining the stresses imposed on structures such as bridge supports etc. Further, it was decided to include an aerofoil profile as such aerofoils are used extensively for accelerating air flows.

The laboratory testing for this study was carried out using the tidal basin facility located in the College of Engineering & Informatics of The National University of Ireland Galway (NUIG).

Figure 1:
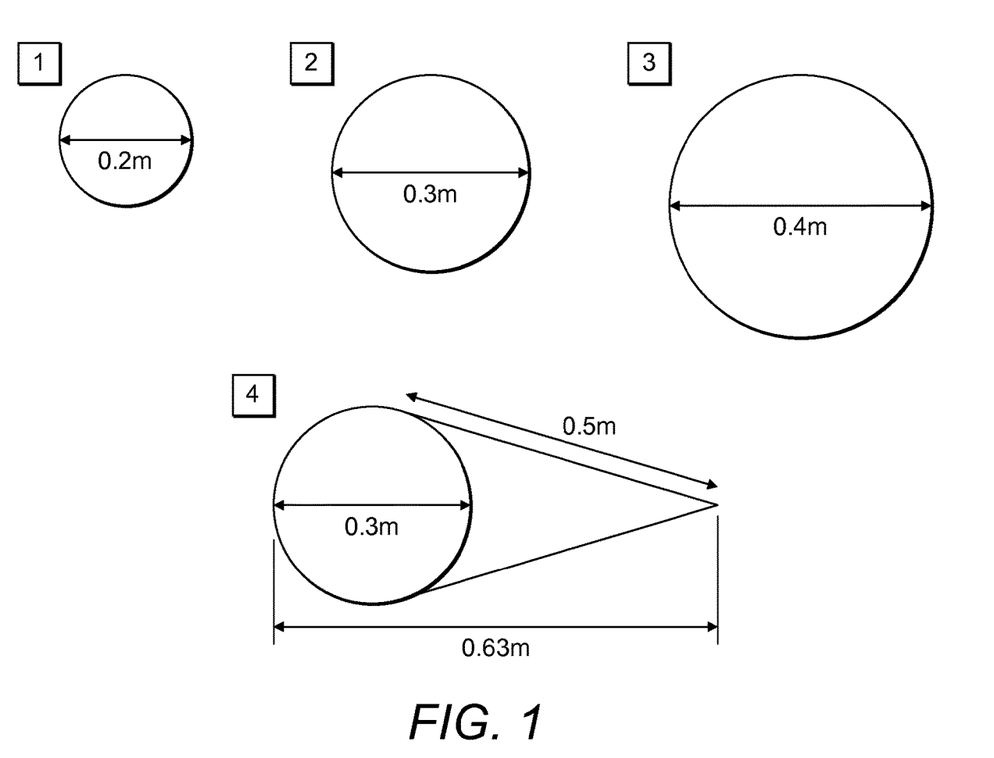
FIG. 1 is a plan view of four cylindrical prototype flow accelerators used for laboratory testing.
Figure 2:
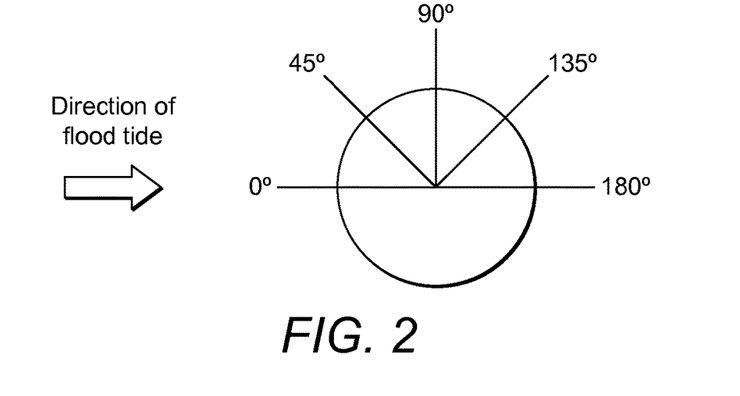
FIG. 2 illustrates the transects along which velocities were measured in the laboratory testing.

Referring now to FIG. 1 there is illustrated three cylinders of respective diameters (0.2 m), (0.3 m), (0.4 m) and all of 0.4 m high, each together with an aerofoil section. So, for a cylinder with, for example, the diameter of (0.3) there is an aerofoil length and a total length of (0.63 m). All tests were run for the same tidal conditions with a maximum tidal flow of the order of 0.003 m/s scaled to represent real tidal conditions. For the cylindrical prototypes current measurements were recorded along the five transects shown in FIG. 2 and then at distances of 8 cm, 12 cm, 16 cm, 20 cm and 24 cm from the cylinder sides. The shapes of the aerofoil allowed a full set of measurements along the 0°, 45° and 90° transects and apart from some measurements along the 135° transects.

Table 1 below shows the mid-flood acceleration expressed as a percentage above the undisturbed ambient flow.

TABLE 1

| Distance from Cylinder Side [cm] | Mid-flood Acceleration [% above Undisturbed] | | |
| --- | --- | --- | --- |
|  | 0.2 m Cylinder | 0.3 m Cylinder | 0.4 m Cylinder |
| 8 | 98 | 109 | 110 |
| 12 | 81 | 82 | 91 |
| 16 | 57 | 65 | 82 |
| 20 | 15 | 46 | 69 |
| 24 | 6 | 12 | 44 |

Certain observations can now be made. Firstly the flow acceleration achieved close to the cylinders, namely at the 8 cm stations were quite similar ranging from 98% to 110%. This suggests that the acceleration achieved immediately adjacent to a cylinder is relatively independent of the cylinder size and will be approximately 100%. Further, it should be noted that there is a clear relationship between cylinders diameter and the width of the region of accelerated flow, the region increasing in size as the size of the cylinder increases. The results are given in FIG. 3.

Figure 3:
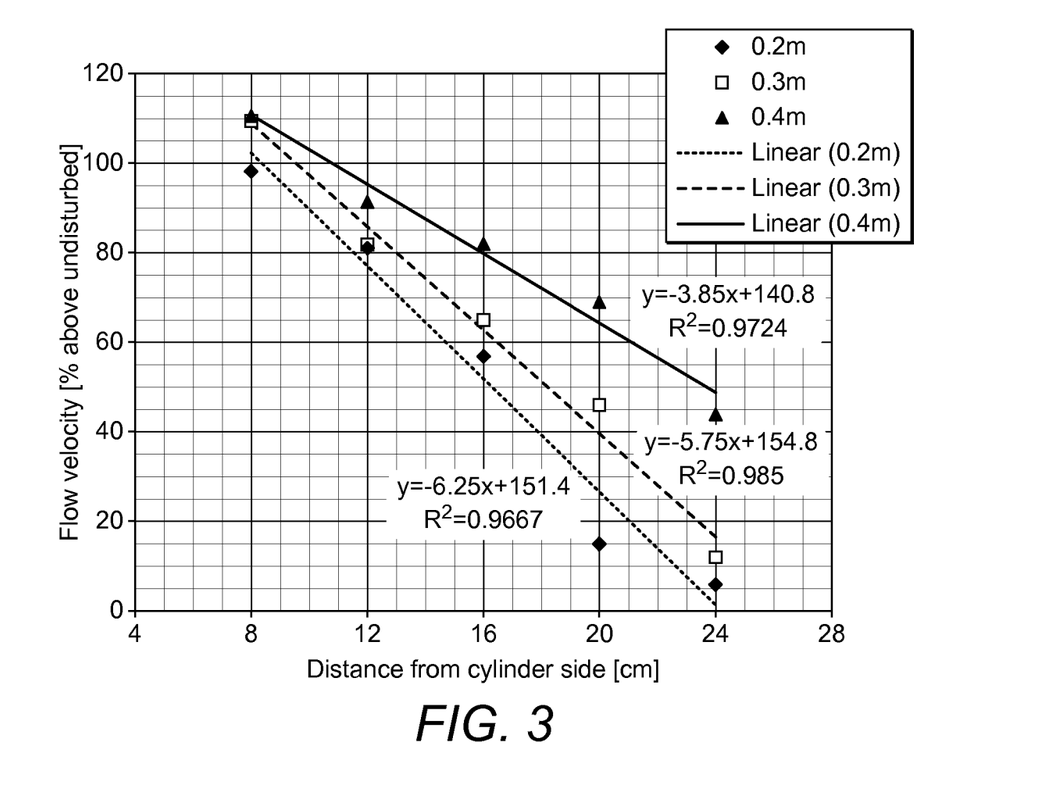
FIG. 3 is a graph comparing flow of accelerations recorded along a 90° transect for the cylindrical prototype flow accelerators of the laboratory testing.

Referring to FIG. 3 this shows clearly the comparison between the flow velocity recorded along with the 90° transect for the cylindrical prototypes.

Firstly, the negative slopes (m) indicates that the magnitude of the accelerations decrease with distance from the cylinder. It further shows that as the cylinder diameter increases, the rate of decrease in accelerations with distance decreases proportionally. This indicates clearly that once the cylinder diameter is known, the width of the accelerations zone can then be estimated. Since this results in considerable linearity it is possible to calculate the distance from the side wall of the accelerator beyond which the accelerations will fall below a certain level. These can clearly be worked out to show that there is a zone of flow velocity of 80% and greater than the undisturbed flow velocity, extending from the accelerator surface to 40% of the cylinder width from the surface, i.e. its diameter. Putting it another way these experiments clearly demonstrate that within a distance of 0.4 D with a cylinder of diameter D the flow velocity will be 80% greater than the uninterrupted tidal stream.

Figure 4:
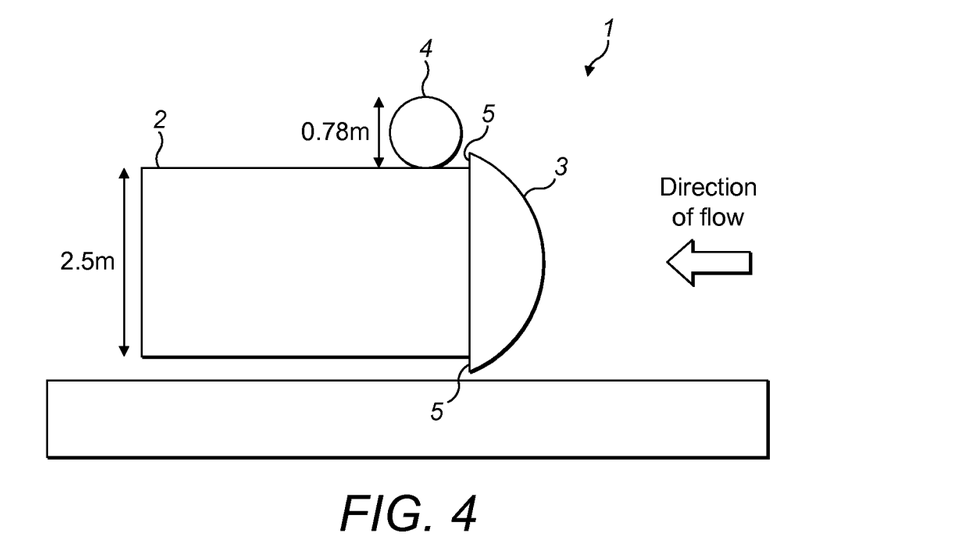
FIG. 4 is a plan view of a barge used in field testing.

Referring to FIG. 4, as previously mentioned, field test had been carried out on a prototype, namely an accelerator and water turbine assembly, indicated generally by the reference numeral 1. There is provided a barge 2 with a width of 2.5 m. The edges of the flow accelerator 3 extend beyond the barge 2 and are in the form of shoulders 5 across some of the vertical water turbine 4 is to shield the portion of the turbine from the accelerated flow in a flow direction as seen in FIG. 4 where the direction of rotation was in opposition to flow direction and therefore reduce the drag forces induced on the turbine.

The shoulders 5 can also be configured to be flaps or deflectors to further accelerate the flow near the widest part of the accelerator body and so partially shield the turbine without the complexity of preparing a recess into which the turbine can be placed.

Figure 5:
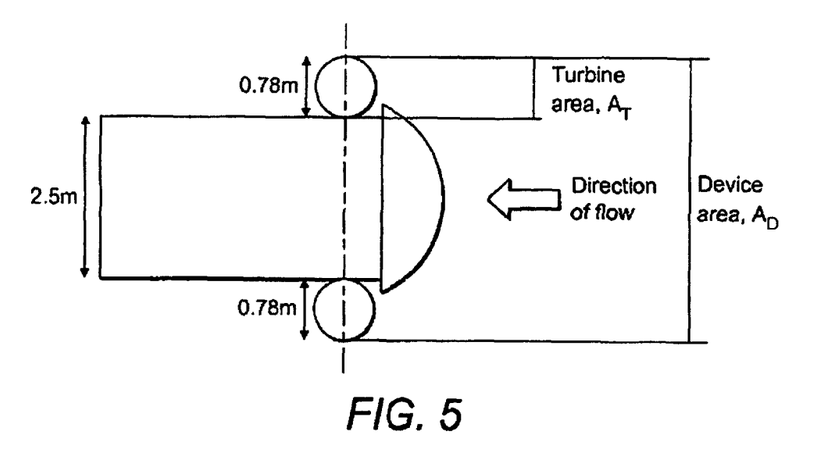
FIG. 5 is a plan view of another barge configuration used in the field testing.

Referring to FIG. 5 there is illustrated the same barge 2, all reference numerals being the same as that in the previous FIG. 4 as they illustrate the same parts. In this embodiment there are two vertical water turbines 4. There is a device area $A_D$ and a turbine area AT which is partially shielded by the shoulder 5. The efficiency of the vertical water turbine 4 was checked and it was found to be operating at approximately 20% that is 34% of the theoretical maximum, being the 59.3% betz theoretical maximum already referred to, for such water turbines. It is very important to appreciate that clearly the turbine being used was not very efficient and could clearly be improved. However, even with that the device efficiency was of the order of 45.9% and this compares very favorably with that reported by Marine Current Turbines Ltd a leader in this industry. They have reported average peak efficiencies of 48% and indeed an instantaneous maximum efficiency of 52% for their 1.2 MW SeaGen device horizontal-axes, twin rotor system operating in Strangford Lough, Northern Ireland since 2008. This clearly demonstrates the advantage of the proposed device over existing technology.

Certain conclusions can be drawn from the laboratory and field tests, namely:

The greatest accelerations are achieved at the widest part of the flow accelerator that is to say along the 90° transect.

The accelerations are highest close to the walls of the accelerator and then decrease linearly with distance from the walls.

Proportionally larger areas of acceleration of more than 80% are achieved with wider accelerators and occur up to approximately 40% of the width.

Figure 6:
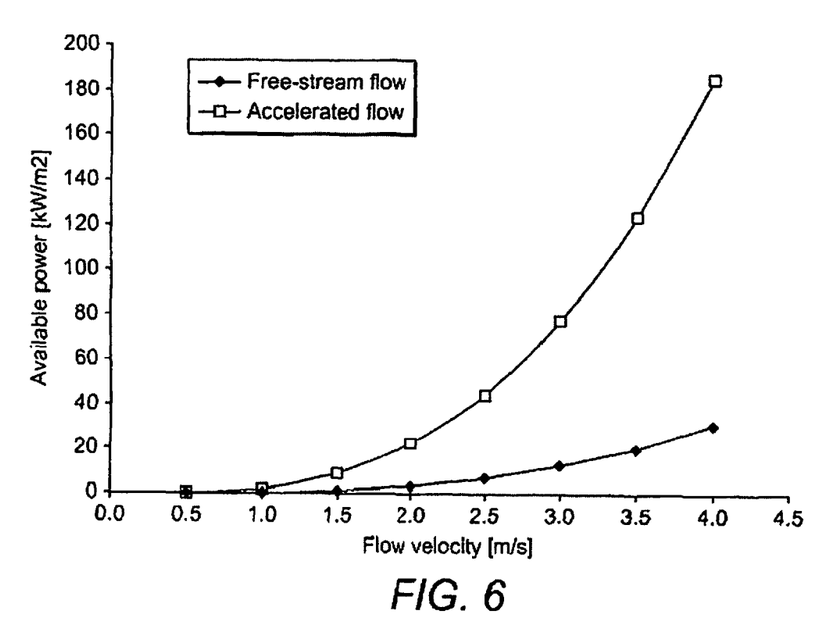
FIG. 6 is a graphical comparison of the total available power from an uninterrupted ambient stream and the same stream flow accelerated by 80%.

Referring now to Table 2 there is illustrated the effect of flow accelerator and on the total available power in the flow stream. This Table 2 and the corresponding graph (FIG. 6) compare the power available from free stream flows of different velocities typical of coastal waters with the power available from the same flow following an 80% acceleration. This demonstrates that an 80% acceleration of ambient flow rates increases the power available for extraction by a factor of 5.8.

TABLE 2

| Free-stream Velocity [m/s] | Available Power [kw/m²] | Accelerated Velocity [m/s] | Available Power [kW] |
| --- | --- | --- | --- |
| 0.50 | 0.04 | 0.90 | 0.22 |
| 1.00 | 0.30 | 1.80 | 1.77 |
| 1.50 | 1.03 | 2.70 | 5.99 |
| 2.00 | 2.43 | 3.60 | 14.19 |
| 2.50 | 4.75 | 4.50 | 27.72 |
| 3.00 | 8.21 | 5.40 | 47.90 |
| 3.50 | 13.04 | 6.30 | 76.06 |
| 4.00 | 19.47 | 7.20 | 113.54 |

To provide a more accurate comparison with the operation of the SeaGen operation which employs two 16 m diameter rotors with a combined swept area of 402.18 m² and achieves its rated power output of 1.2 MW at 2.5 m/s. All our testing and investigations to date suggest that the device of the design used in the present testing, using two vertical axis turbines mounted at the sides of the water flow accelerator, as described herein, and having a total area similar to that of the Strangford device would generate 1.44 MW. The total swept area of the turbines used with the arrangement described in this specification would be 176 m² compared to the 402 m² of the SeaGen installation in Strangford. The forward facing area of the water flow accelerator would be of the order of 222 m². It should be appreciated that this figure is based on field test results that used a water turbine with an indicative efficiency of the order of 15-20%. Since there are already existing vertical axis turbines with efficiencies of 35% it would not be unreasonable to suggest that an output of 2.88 MW compared to that of the SeaGen installation, namely, 1.2 MW is achievable. Without going into the matter in any great depth it is reasonable to suggest that the size of the turbine used is of the order of 40-50% SeaGen turbine size. Since this is clearly the very expensive part of the total installation cost the capital outlay will also be considerably cheaper.

The present proposal is smaller turbines operating in the laminar flow zone of highest velocity as this seems to be the most logical advance.

These comparisons clearly show that the present invention has considerable advantages over what is known in the industry. Further, because of the acceleration process it becomes viable to deploy existing turbines in locations were maximum speeds do not exceed 1.5 m/s as existing turbines are not viable in flow velocities below 2.5 m/s.

There were some other interesting results from the field trials which showed that shrouding too much of the water turbine was not that successful.

Figure 7:
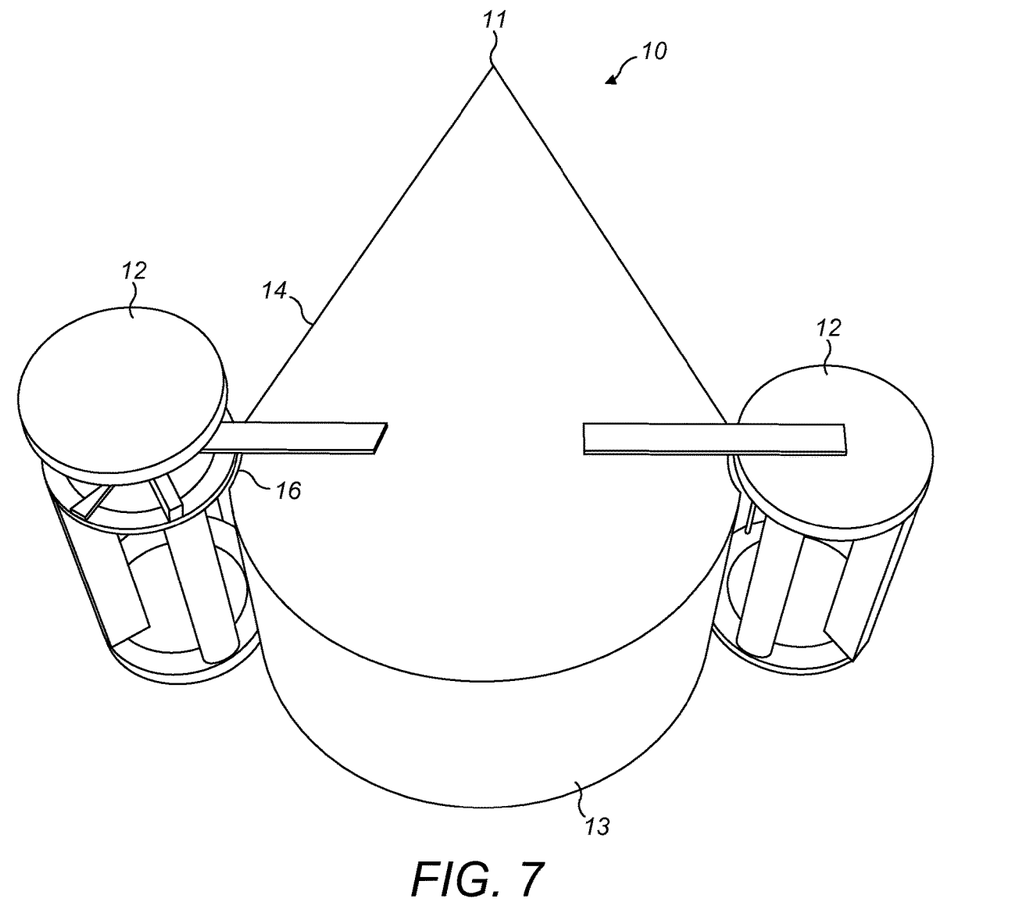
FIG. 7 is a stylised perspective view of a pontoon used for carrying out the invention.

FIG. 7 shows an arrangement in which the accelerator body has a more aerofoil shape and in which a portion of the water turbine would be mounted within a recess of the accelerator body adjacent its widest portion.

In this embodiment the accelerator and water turbine assembly, indicated generally by the reference numeral 10, comprises an accelerator in the form of a pontoon 11 mounting two water turbines 12. The pontoon 11 has a front face 13 and side faces 14, each side face 14 having a recess 16 for receiving one of the water turbines 12.

The accelerator body could additionally be provided with shoulders just at the edge of the body, as can be seen in FIGS. 4 and 5.

There are clear advantages in using a pontoon, not least one of which is being able to position the water turbines where the uninterrupted ambient tidal stream is greatest, but also for ease of operation and maintenance.

However, it will be appreciated that there are other means of mounting and securing the accelerator body in a flow. It can advantageously be tethered to the bottom of the waterway or seabed and be fully or nearly fully submerged. An alternative is that the accelerator body could be formed around a support or column for a bridge and the turbines could be attached to the accelerator body or bridge support in an appropriate manner.

Figure 8:
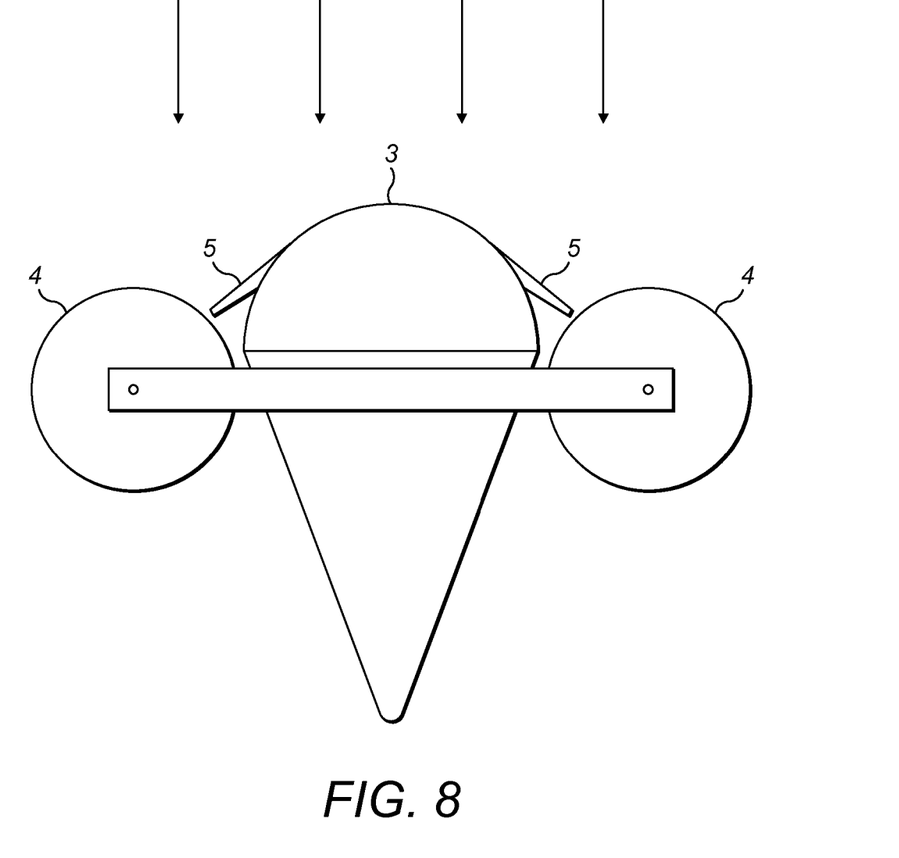
FIG. 8 is a plan view of another construction of an accelerator body showing the flaps used to deflect accelerated water flow.

FIG. 8 shows an alternative arrangement for the accelerator body. The accelerator body 3 is shown with the arrows indicating the direction of water flow. Mounted on and depending from the sides of the body 3 are a pair of turbines 4. These are spaced slightly away from the accelerator body and are also located slightly downstream of the widest part of the accelerator body 3. The body 3 is provided with flaps or deflectors 5. The flaps 5 are used to modify the surface of the body and the flow across it near the widest point. They accelerate the flow and also provide some shielding for the turbine so that the portion of the turbine closest to the body is shielded from the accelerated flow. It is envisaged that the turbines will rotate in opposite directions and so shielding the portion of the turbine closest to the body will reduce the drag on that part of the turbine rotating against the flow. Various designs of flap or deflector can be envisaged. It has been found to be more convenient to use flaps to deflect the flow than to construct recesses into which the turbines can be partially inserted.

It will also be noted that when of the order of 50% of the width of the water turbine was buried/shrouded within the water flow accelerator the efficiency dropped. This would appear to be related to the design of turbine used. This particular design of turbine which is not being disclosed at the present moment is of a particularly innovative design and does not form a part of the present invention.

Figure 9A:
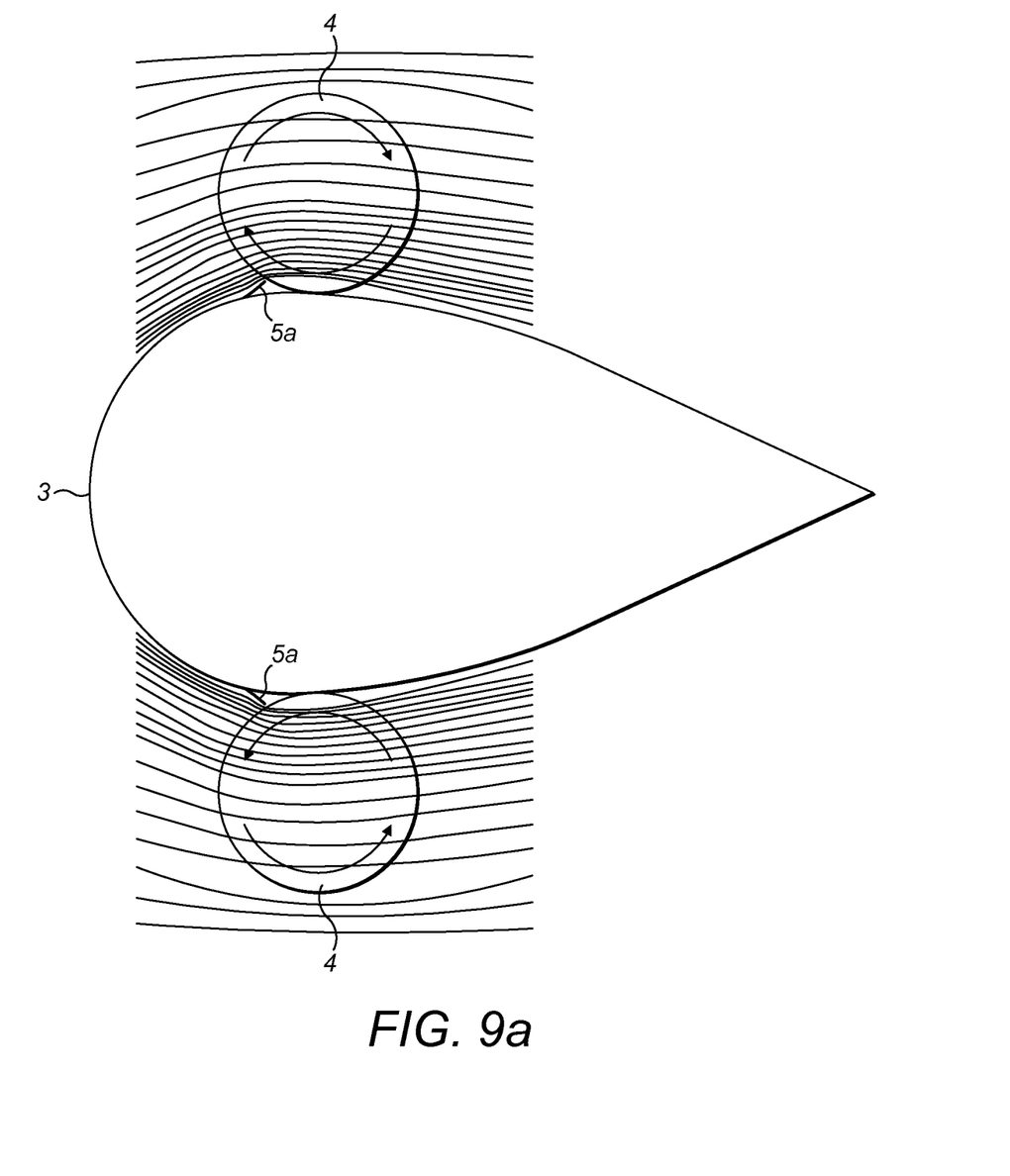
FIGS. 9a and 9b show further examples of deflector flaps and their effect on the flow.
Figure 9B:
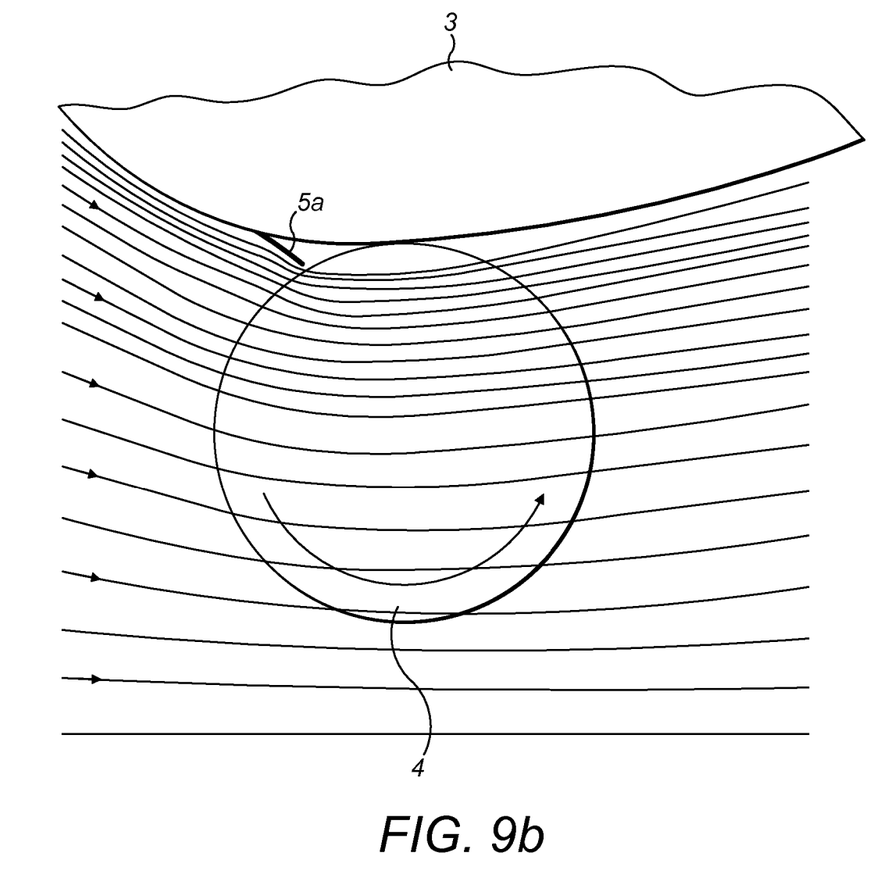

FIGS. 9a and 9b show an alternative design of deflector flap. The figures show an accelerator body 3 in a flow stream. The representation of the flow pattern is conventional flow lines, with lines closer together representing a faster flow rate. The turbine body 4 is shown as mounted at the widest part of the accelerator body or just downstream from it. Any disturbance or perturbation of the flow by the turbine is not shown. Arrows on the turbine body indicate the preferred direction of rotation of the turbine. Deflector flaps 5a are shown just upstream of the widest part of the accelerator body. In this example, the deflector flaps are relatively small but provide sufficient deflection of the flow to further accelerate the flow and also to shield the portion of the turbine closest to the accelerator body (where the flow is fastest). The advantage of the shielding effect is that it enables the portion of the turbine moving in an upstream direction to do so shielded from the accelerated flow, so reducing drag and inefficiency.

It is essential when placing an accelerator and water turbine assembly in a tidal stream whether in the form of a permanent, semi-permanent or floating, submerged or semi-submerged structure such as a pontoon that the entire assembly is far enough removed from any other flow obstruction that would have a relatively significant influence on the turbine driver current. It is probably ideal in many instances that laterally spaced apart from any turbine forming part of the assembly there is an effectively uninterrupted ambient tidal stream. The important factor here is that any such flow obstruction should not have a relatively significant negative influence on the turbine driver current. For these reasons, accelerator and water turbines of the present invention are well suited for use in expansive (relatively wide and deep) open flows where fluids could find an easier path of less resistance. Therefore if two accelerators are too close together their combination becomes a single obstruction and the area between them restricts the flow and causes turbulence.

It is envisaged on the basis of various tests carried out that the placement of what are affected a series of cascading accelerator and water turbine assemblies according to the invention may be arranged in a tidal stream whereby the local tidal stream impinging on the next succeeding accelerator and water turbine assembly being such as to provide what is effectively an accelerated tidal stream over and above that of the uninterrupted ambient tidal stream, upstream of the array of accelerator and water turbine assemblies. It would appear that having an array in the form of rows and columns of accelerator and water turbine assemblies according to the invention could be advantageous where the rows of accelerator and water turbine assemblies are substantially transverse across the direction of the ambient tidal stream, namely at 90° thereto and the columns are at 45° with respect to the ambient tidal stream. Effectively, the following accelerator and water turbine assemblies are staggered with respect to those on the preceding row. The purpose of the arrangement being such as to provide for the succeeding accelerator and water turbine assemblies an arrangement whereby the tidal stream being experienced by these succeeding accelerator and water turbine assemblies has a speed greater than that of the uninterrupted ambient tidal stream.

Another interesting result, not originally expected, was that because of using a turbine driver current considerably greater than that of the uninterrupted ambient current, the debris that in many instances appears with existing inventions to have been delivered to their respective turbines, was not a problem with the present invention. It appears that because the direction of flow of the driver current is somewhat outwards and away from the accelerator body and side portions before it meets the water turbine which is clearly an obstruction and changes in hydraulic pressures adjacent to the accelerator faces, that it tends to divert the debris away from the accelerator body or pontoon and water turbine.

In this specification the terms "include" and "comprise" and any necessary grammatical variations thereof are to be considered interchangeable and to be accorded the widest possible interpretation.

The invention is not limited to the embodiments described above but may be varied in both construction and detail within the scope of the claims.

The invention claimed is:

1. An accelerator and water turbine assembly for mounting in a tidal stream, said assembly comprising:
a water flow accelerator for providing a turbine driver current, the water flow accelerator comprising an accelerator body member including side faces and a water-flowing facing front face; and
at least one water turbine mounted to the accelerator body member rearward of the water-flowing facing front face surface and laterally spaced apart from one side face of the side faces respectively;
the water-flowing facing front face including ends forward of the widest width of the accelerator body member, each end extending in a lateral direction beyond a respective side face so that the front face covers at least 10% but not more than 30% of an outermost cylinder width of the at least one water turbine, wherein the at least one water turbine projects a lateral distance from the respective side face that is 0.4 of the widest width of the accelerator body member.

2. The accelerator and water turbine assembly as claimed in claim 1 in which the water-flowing front face of the accelerator body member is of arcuate shape.

3. The accelerator and water turbine assembly according to claim 2 in which the arcuate shape is semi-circular.

4. The accelerator and water turbine assembly according to claim 2 in which the accelerator body member water-flowing front face is ellipsoidal in plan.

5. The accelerator and water turbine assembly as claimed in claim 1 in which the ends are at least one flap or deflector to increase velocity and deflect flow from the side faces and partially shield the at least one water turbine from the turbine driver current.

6. The accelerator and water turbine assembly according to claim 1 in which the accelerator body member is a pontoon.

7. The accelerator and water turbine assembly according to claim 1 in which the accelerator body member is tethered to a bottom of a waterway.

8. An accelerator and water turbine assembly for mounting in a tidal stream, said assembly comprising:

a pair of water turbines, each water turbine comprising a set of blades that are circumferentially spaced apart from each other around an axis of rotation and define a turbine width of the respective water turbine, wherein the respective axes of rotation of the water turbines are parallel to each other to lie in a common plane, and wherein a spacing between the water turbines is greater than either of the respective turbine widths; and a water flow accelerator disposed in the spacing between the water turbines, the water flow accelerator comprising:

a convex front face that extends laterally between the water turbines upstream of the respective axes of rotation of the water turbines to accelerate a respective turbine driver current flowing through each water turbine, wherein the front face is laterally narrower than a lateral distance between the respective axes of rotation of the water turbines; and side faces that extend longitudinally to intersect the common plane in which the axes of rotation of the water turbines lie, each side face extending adjacent to a respective one of the water turbines;

wherein each side face of the water flow accelerator and the respective adjacent water turbine diverge in a downstream direction from the axis of rotation of the respective water turbine.

9. The accelerator and water turbine assembly according to claim 8, wherein the front face is shaped to direct at least a portion of each turbine driver current between the axis of rotation of the respective water turbine and the water flow accelerator.

10. The accelerator and water turbine assembly according to claim 8, wherein the front face extends laterally beyond each side face.

11. The accelerator and water turbine assembly according to claim 10, wherein the water flow accelerator comprises a pair of laterally-extending deflector flaps, each deflector flap being disposed at a respective lateral end of the front face and being configured to direct water towards the blades of a respective one of the water turbines.

* * * * *